United States Patent
Schilling et al.

(10) Patent No.: US 9,850,077 B2
(45) Date of Patent: Dec. 26, 2017

(54) AUXILIARY TANK EXHAUST SYSTEM FOR AN AGRICULTURAL PRODUCT DISTRIBUTION SYSTEM

(71) Applicant: CNH Industrial Canada, Ltd., Saskatoon (CA)

(72) Inventors: Robin Bruno Schilling, Darfield (CA); Graham Douglas Stuart, Warman (CA); Martin J. Roberge, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 43 days.

(21) Appl. No.: 14/930,411

(22) Filed: Nov. 2, 2015

(65) Prior Publication Data

US 2016/0122137 A1 May 5, 2016

Related U.S. Application Data

(60) Provisional application No. 62/075,163, filed on Nov. 4, 2014.

(51) Int. Cl.
*B65G 53/60* (2006.01)
*A01C 15/00* (2006.01)

(52) U.S. Cl.
CPC ............ *B65G 53/60* (2013.01); *A01C 15/003* (2013.01); *A01C 15/006* (2013.01)

(58) Field of Classification Search
CPC ..... A01C 15/003; A01C 15/00; A01C 15/006; B65G 53/60; B65G 53/34; B65G 53/00
See application file for complete search history.

(56) References Cited

U.S. PATENT DOCUMENTS

| 1,477,345 A | 12/1923 | Hagadone |
|---|---|---|
| 2,327,494 A | 8/1943 | Brown |

(Continued)

FOREIGN PATENT DOCUMENTS

| AU | 2011239223 B2 | 5/2013 |
|---|---|---|
| CA | 2245338 A1 | 2/2000 |

(Continued)

OTHER PUBLICATIONS

U.S. Appl. No. 14/929,675, filed Nov. 2, 2015, Dennis George Thompson.

(Continued)

*Primary Examiner* — Christopher J. Novosad
(74) *Attorney, Agent, or Firm* — Rebecca L. Henkel; Rickard K. DeMille

(57) ABSTRACT

An exhaust system of an agricultural product container includes a first media screen configured to be coupled to the agricultural product container. The first media screen includes a first plurality of apertures. The first media screen is configured to block a granular product from entering the exhaust system and enabling an air flow into the exhaust system. The exhaust system includes a diffuser having a first diffuser aperture configured to diffuse the air flow in a downward direction. The exhaust system further includes a passage fluidly coupled between the first media screen and the diffuser. The passage is configured to selectively guide the air flow from the first media screen toward the diffuser.

20 Claims, 7 Drawing Sheets

(56) References Cited

U.S. PATENT DOCUMENTS

| | | | |
|---|---|---|---|
| 2,491,232 A | 12/1949 | Turnbull | |
| 2,560,431 A | 7/1951 | Garber | |
| 2,682,428 A * | 6/1954 | Roberts | A01C 7/004 111/130 |
| 4,060,181 A | 11/1977 | Grataloup | |
| 4,186,885 A | 2/1980 | Christian | |
| 4,296,695 A | 10/1981 | Quanbeck | |
| 4,473,016 A | 9/1984 | Gust | |
| 4,630,773 A | 12/1986 | Ortlip | |
| 4,905,912 A | 3/1990 | Bruch | |
| 4,944,637 A | 7/1990 | Fletcher | |
| 5,379,812 A | 1/1995 | McCunn et al. | |
| 5,392,722 A | 2/1995 | Snipes et al. | |
| 5,575,225 A | 11/1996 | Smith et al. | |
| 5,592,889 A | 1/1997 | Bourgault | |
| 5,628,262 A | 5/1997 | Nelson | |
| 5,740,746 A | 4/1998 | Ledermann et al. | |
| 5,802,994 A | 9/1998 | Kinkead et al. | |
| 5,842,428 A | 12/1998 | Stufflebeam et al. | |
| 5,878,679 A | 3/1999 | Gregor et al. | |
| 5,898,376 A | 4/1999 | Webb | |
| 5,915,312 A | 6/1999 | Meyer et al. | |
| 5,947,040 A | 9/1999 | Gregor | |
| 5,980,163 A | 11/1999 | Gregor et al. | |
| 6,003,455 A | 12/1999 | Flamme et al. | |
| 6,148,863 A | 11/2000 | Memory et al. | |
| 6,213,690 B1 | 4/2001 | Gregor et al. | |
| 6,584,919 B2 | 7/2003 | McQuinn | |
| 6,668,738 B2 | 12/2003 | Lee et al. | |
| 6,675,728 B2 | 1/2004 | Lee et al. | |
| 6,688,245 B2 | 2/2004 | Juptner | |
| 6,845,724 B2 | 1/2005 | Mayerle et al. | |
| 6,883,445 B2 | 4/2005 | Mayerle | |
| 6,928,938 B2 | 8/2005 | Memory | |
| 7,104,478 B2 | 9/2006 | Niemela et al. | |
| 7,270,065 B2 | 9/2007 | Conrad | |
| 7,380,733 B2 | 6/2008 | Owenby et al. | |
| 7,469,915 B2 | 12/2008 | Horn et al. | |
| 7,500,814 B2 | 3/2009 | Meyer | |
| 7,500,817 B2 | 3/2009 | Furrer et al. | |
| 7,549,383 B2 | 6/2009 | Sauder et al. | |
| 7,703,404 B2 | 4/2010 | Horn et al. | |
| 7,735,437 B2 | 6/2010 | Pollington et al. | |
| 7,779,769 B2 | 8/2010 | Memory | |
| 7,798,078 B2 | 9/2010 | Memory | |
| 8,074,586 B2 | 12/2011 | Garner et al. | |
| 8,262,004 B2 | 9/2012 | Gamble, II et al. | |
| 8,342,373 B2 | 1/2013 | Memory et al. | |
| 8,386,137 B2 | 2/2013 | Sauder et al. | |
| 8,408,478 B2 | 4/2013 | Wonderlich | |
| 8,504,310 B2 | 8/2013 | Landphair et al. | |
| 8,517,118 B2 | 8/2013 | Remoué | |
| 8,683,930 B2 | 4/2014 | Cresswell et al. | |
| 2005/0072954 A1 | 4/2005 | Nielsen | |
| 2005/0235890 A1 | 10/2005 | Mariman et al. | |
| 2006/0120836 A1 | 6/2006 | Cresswell et al. | |
| 2007/0163660 A1 | 7/2007 | Mowatt et al. | |
| 2010/0224110 A1 | 9/2010 | Mariman | |
| 2011/0035163 A1 | 2/2011 | Landphair | |
| 2011/0167712 A1 | 7/2011 | Brasil | |
| 2012/0103238 A1 | 5/2012 | Beaujot et al. | |
| 2012/0201631 A1 | 8/2012 | Fitzgerald et al. | |
| 2012/0211508 A1 | 8/2012 | Barsi et al. | |
| 2012/0230779 A1 | 9/2012 | Dunstan | |
| 2012/0301231 A1 | 11/2012 | Jagow et al. | |
| 2012/0312210 A1 | 12/2012 | Riffel et al. | |
| 2012/0316736 A1 | 12/2012 | Hubalek et al. | |
| 2012/0325809 A1 | 12/2012 | Hall et al. | |

FOREIGN PATENT DOCUMENTS

| | | |
|---|---|---|
| CA | 2755585 A1 | 4/2013 |
| CN | 200944739 Y | 9/2007 |
| CN | 201022263 Y | 2/2008 |
| DE | 19826944 A1 | 12/1999 |
| DE | 10051526 A1 | 4/2002 |
| DE | 10319047 A1 | 11/2004 |
| EP | 2060163 A1 | 5/2009 |
| GB | 900255 | 7/1962 |
| GB | 2307680 A | 6/1997 |
| WO | 2014096671 A1 | 6/2014 |
| WO | 2014147004 A1 | 9/2014 |

OTHER PUBLICATIONS

Bourgault Industries Ltd.; Product Catalogue; Oct. 2006; http://www.bourgault.com/LinkClick.aspx?fileticket=iLUTx7kVhnl%3D&tabid=416&language=en-US accessed Oct. 30, 2015.

Bourgault North America; Model 7950 Air Seeder; 2012; http://www.bourgault.com/SearchProduct/ViewProduct/tabid/168/docid/387/IsSearch/false/New/true/mode/1/language/en-US/Default.aspx accessed Oct. 30, 2015.

\* cited by examiner

AUXILIARY TANK EXHAUST SYSTEM FOR AN AGRICULTURAL PRODUCT DISTRIBUTION SYSTEM

CROSS-REFERENCE TO RELATED APPLICATION

This application claims priority from and the benefit of U.S. Provisional Application Ser. No. 62/075,163, entitled "AUXILIARY TANK EXHAUST SYSTEM FOR AN AGRICULTURAL PRODUCT DISTRIBUTION SYSTEM", filed Nov. 4, 2014, which is hereby incorporated by reference in its entirety.

BACKGROUND

The invention relates generally to agricultural product distribution systems and, more particularly, to an exhaust system for a product container in the agricultural product distribution system.

Generally, an agricultural product distribution system may include an agricultural implement towed behind an off-road work vehicle, such as a tractor. More specifically, the agricultural implement may include multiple rows of ground engaging opener assemblies to excavate trenches into soil for depositing a granular product, such as seeds or fertilizer. Additionally, the agricultural product distribution system may include an air cart to centrally store and distribute the granular product to the ground engaging opener assemblies. In this manner, rows of the granular product may be deposited into the soil. As the granular product is distributed, it may become desirable to refill the air cart (e.g., when empty or few seeds remain).

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, an exhaust system of an agricultural product container includes a first media screen configured to be coupled to the agricultural product container, wherein the first media screen includes a first plurality of apertures, wherein the first media screen is configured to block a granular product from entering the exhaust system and enabling an air flow into the exhaust system, a diffuser comprising a first diffuser aperture configured to diffuse the air flow in a downward direction, and a passage fluidly coupled between the first media screen and the diffuser, wherein the passage is configured to selectively guide the air flow from the first media screen toward the diffuser.

In a second embodiment, an agricultural system includes an agricultural product container configured to hold a granular product, wherein the agricultural product container includes a plurality of inlet tubes configured to supply the granular product to the agricultural product container by guiding an air flow entraining the granular product into the agricultural product container, and an exhaust system configured to selectively vent the agricultural product container by blocking the air flow through the exhaust system when the granular product is not being supplied, and enabling the air flow through the exhaust system when the granular product is being supplied.

In a third embodiment, a method for controlling an exhaust system on an agricultural product container includes pneumatically distributing a granular product in the agricultural product container using a plurality of inlet tubes that guide an air flow entraining the granular product into the agricultural product container, dislodging the granular product from the air flow using a media screen, and opening an exhaust valve fluidly coupled between the media screen and a diffuser when the granular product is being distributed in the agricultural product container to enable the air flow to flow from the media screen to the diffuser.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
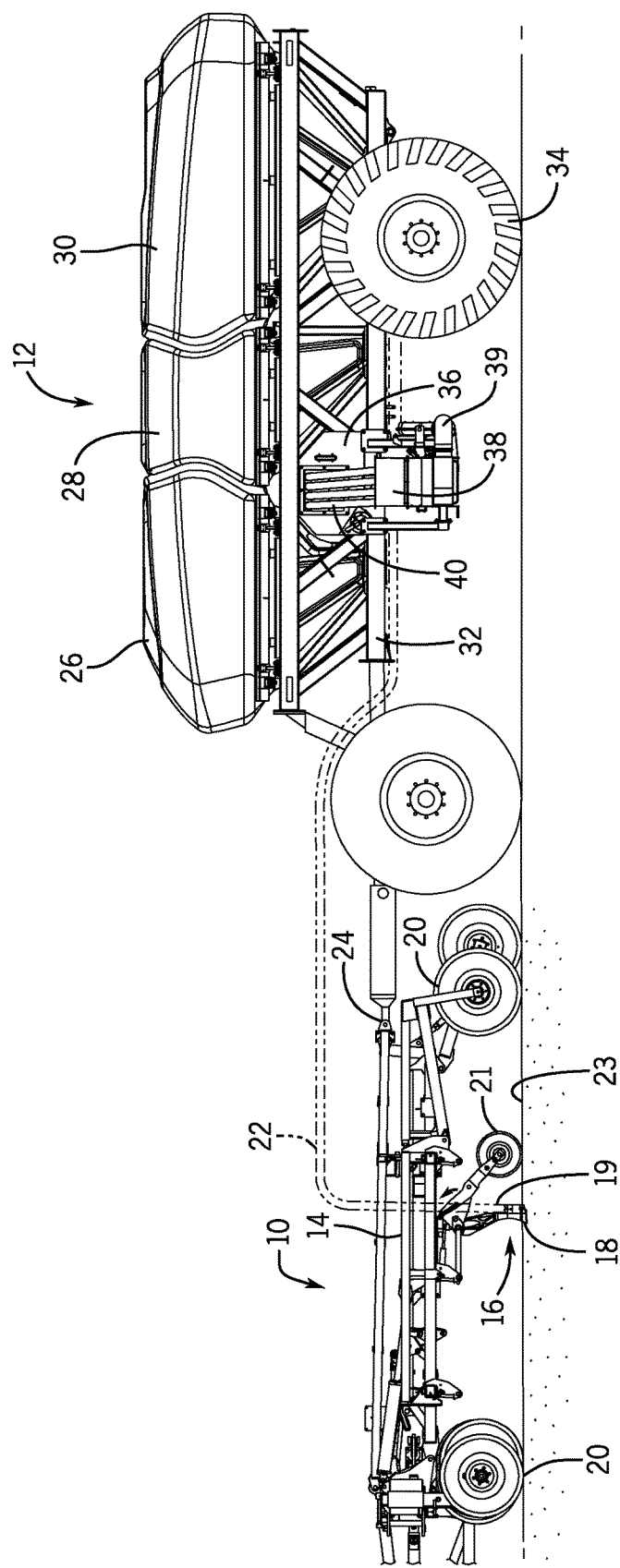
FIG. 1 is a side view of an agricultural implement with an air cart, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

An agricultural product distribution system generally enables multiple rows of a granular product to be deposited into soil. As used herein the granular product may be any suitable particulate material that is desired to be deposited into the ground, such as various types of seeds and fertilizers. More specifically, an agricultural implement may include multiple rows of ground engaging opener assemblies on an agricultural implement. Each of the ground engaging opener assemblies may engage the soil to excavate a trench and deposit the granular product into the trench. In this manner, rows of the granular product may be deposited into the soil.

To facilitate deposition, the granular product may be stored in and distributed from a centralized location, such as an air cart. For example, on the air cart, one or more product containers may centrally store the granular product and a seed meter may control the distribution of the granular product to each of the ground engaging opener assemblies. Thus, as the granular product is distributed, it may become desirable to refill the one or more product containers (e.g., when empty or when few seeds remain). Further, some granular products (e.g., canola seeds) may be expensive making it desirable to practice care when storing the granular product. Moreover, sensitive seeds could be damaged by augers and a special care is desired during the filling of the tank. As such, it may be desirable to use a pneumatic filling system. However, when a product container is filled/refilled, the granular product and/or air from the pneumatic filling system may displace a large amount of air within the product container.

Accordingly, as will be described in more detail below, embodiments described herein may improve the filling and/or refilling of a product container on an air cart. For example, one embodiment describes an exhaust system of an agricultural product container, which includes a first media screen configured to be coupled to the agricultural product container, in which the first media screen includes a first set of apertures configured to block a granular product from entering the exhaust system and enabling an air flow into the exhaust system. The exhaust system includes a diffuser having a second plurality of apertures configured to diffuse the air flow in a downward direction, and a passage fluidly coupled between the first media screen and the diffuser, wherein the passage is configured to selectively guide the air flow from the first media screen towards the diffuser.

To help illustrate, a side view of an agricultural implement 10 coupled to an air cart 12 is shown in FIG. 1. As depicted, the agricultural implement 10 includes a tool frame 14 coupled to a ground engaging opener assembly 16, and wheel assemblies 20.

As described above, the agricultural implement may be pulled by an off-road work vehicle (e.g., a tractor) to deposit rows of the granular product. Accordingly, the wheel assemblies 20 may contact the soil surface to enable the agricultural implement 10 to be pulled by the off-road work vehicle. As the agricultural implement 10 is pulled, a row of product may be deposited in the soil by the ground engaging opener assembly 16. Although only one ground engaging opener assembly 16 is shown, the agricultural implement 10 may actually include multiple ground engaging opener assemblies 16 organized in a row across the agricultural implement 10. In some embodiments, the agricultural implement 10 may include a row of 12, 14, 16, 18, 20, or more ground engaging opener assemblies 16, which may each deposit a row of the granular product.

To facilitate depositing the granular product, the ground engaging opener assembly 16 includes an opener 18, a seed tube 19, and a trail press wheel 21. More specifically, when the opener 18 engages the soil 23, the opener 18 may exert a downward force that excavates a trench into the soil 23 as the ground engaging opener assembly 16 travels over the soil 23. As the agricultural implement 10 continues to travel, the granular product may be deposited into the excavated trench by the seed tube 19. Then, the trail press wheel 21 may pack soil over the granular product.

As described above, the depositing of the granular product by the ground engaging opener assembly 16 may be controlled by the distribution of the granular product from the air cart 12. In some embodiments, the air cart 12 may pneumatically distribute seeds or other granular products to the ground engaging opener assembly 16 via a hose 22. The granular product may flow from the hose 22, through the seed tube 19, and into the trench. In other words, the air cart 12 may control the deposition by the ground engaging opener assembly 16 by controlling the rate at which the granular product is supplied to the ground engaging opener assembly 16. Additionally, the air cart 12 may supply granular product to multiple ground engaging opener assemblies 16. As such, the air cart 12 may control the deposition of the granular product in multiple rows.

In the depicted embodiment, the air cart 12 is towed behind the agricultural implement 10. More specifically, the agricultural implement 10 may be coupled to the off-road work vehicle by a first hitch assembly (not shown), and the air car 12 may be coupled to the agricultural implement 10 by a second hitch assembly 24. For example, in the depicted embodiment, the hitch assembly 24 is coupled between the tool frame 14 and the air cart frame 32, which enables the air cart 12 to be towed with the agricultural implement 10. However, in other embodiments, the agricultural implement 10 may be towed behind the air cart 12. In further embodiments, the implement 10 and the air cart 12 may be part of a single unit that is towed behind an off-road work vehicle, or the implement and air cart may be elements of a self-propelled vehicle.

As described above, the air cart 12 may centrally store the granular product and distribute the granular product to the ground engaging opener assemblies 16. Accordingly, as depicted, the air cart 12 includes three primary product containers 26, 28, 30, a frame 32, and wheels 34. Further, the air cart 12 includes a secondary product container 36, a fill hopper 38, an air supply 39, and product conveyance conduits (e.g., inlet tubes 40).

More specifically, the primary product containers 26, 28, 30 and the secondary product container 36 may each centrally store a granular product (e.g., seeds, granular fertilizer, granular inoculants, or any mixture thereof). In some embodiments, the primary product containers 26, 28, 30 may include a single large storage compartment for storing a single granular product. However, as in the depicted embodiment, the primary product containers 26, 28, 30 may be separate, thereby enabling each to store a different granular product. For example, the first primary product container 26 may store legume seeds, the second primary product container 28 may store a dry fertilizer, and the secondary product container 36 may store a granular inoculant to deposit with the legume seeds. In such embodiments, the air cart 12 may deliver seed, fertilizer, and inoculant to the implement 10 via separate distribution systems, or as a mixture through a single distribution system.

Additionally, in the depicted embodiment, the secondary product container 36 is positioned beneath portions of the primary product containers 26, 28, and 30. More specifically, the secondary product container 36 may be shaped to correspond with the sloped bottom portions of the primary product containers 26 and 28. In this manner, the secondary product container 36 may utilize a greater portion of the space beneath the primary product containers 26 and 28, thereby improving the spatial efficiency on the air cart 12.

Figure 2:
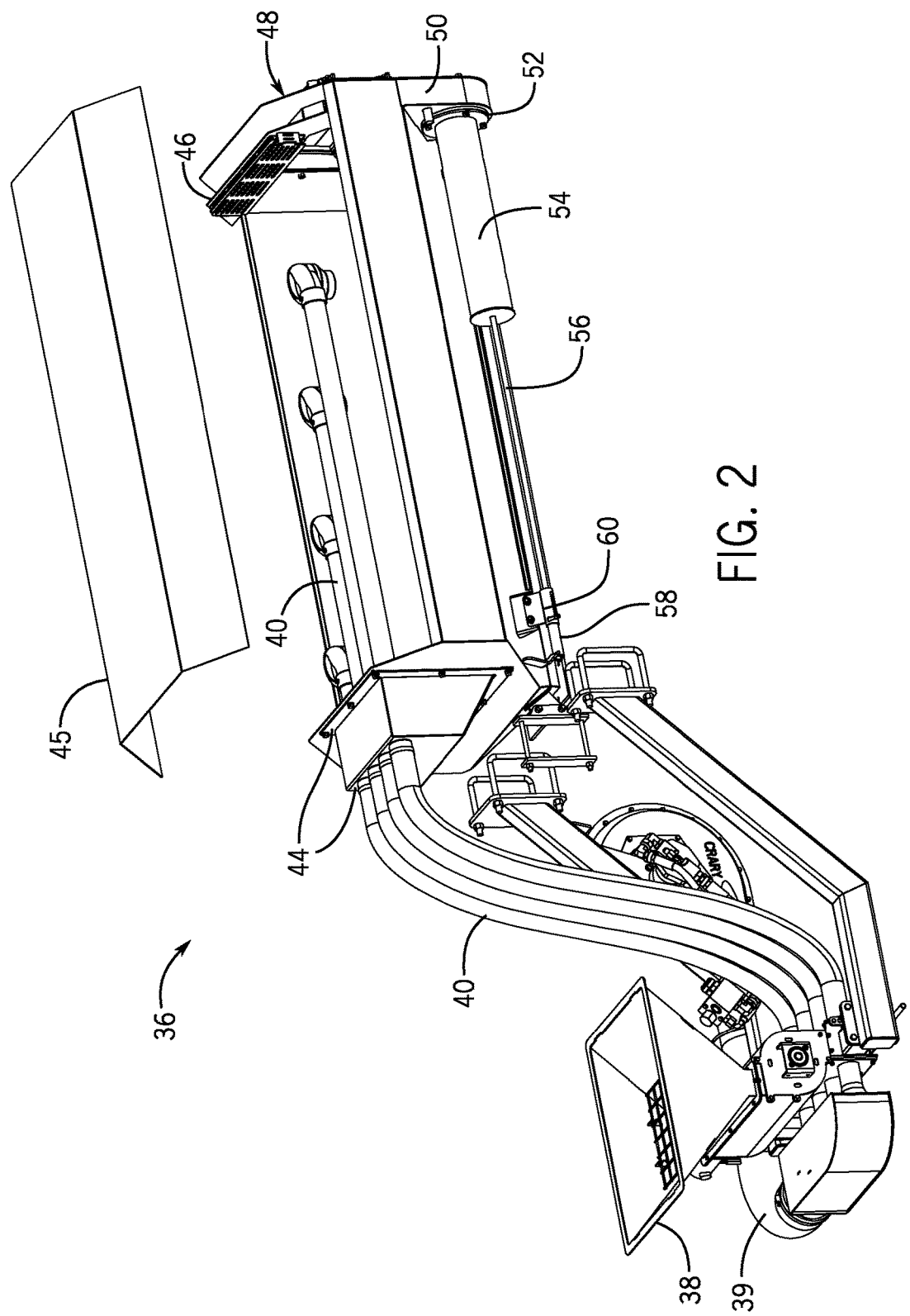
FIG. 2 is a perspective view of a secondary product container with a fill system, in accordance with an embodiment of the present disclosure.

Furthermore, as depicted, the secondary product container 36 is coupled to a fill hopper 38 with inlet tubes 40. More specifically, the fill hopper 38 and the inlet tubes 40 may enable an operator to fill/refill the secondary product container 36 with a granular product. To help illustrate, the secondary product container 36 with a fill system is shown in FIG. 2. While the fill system described herein is used with a secondary product container 36, one of ordinary skill in the art will recognize that the techniques may be adapted to other product containers, such as primary product containers 26, 28, and 30.

In the depicted embodiment, the lid 45 of the secondary product container 36 is removed to more clearly illustrate the fill system, which may include the fill hopper 38, the inlet tubes 40, inlet ports 44, and an exhaust system (e.g., media screens 46 and a diffuser 54). More specifically, the inlet ports 44 may interface with the inlet tubes 40 to fluidly couple the secondary product container 36 and the fill hopper 38. In this manner, the granular product may be input into the fill hopper 38 and pneumatically delivered to the secondary product container 36. Additionally, as in the depicted embodiment, the inlet tubes 40 may extend varying lengths into the secondary product container 36 to enable the granular product to be evenly distributed within the secondary product container 36.

However, as described above, when the granular product is input to the secondary product container 36, an air flow may be created as the granular product displaces air. In addition to air being displaced due to the granular product, air may flow into the secondary product container 36 as the granular product is supplied to the secondary storage tank in via the pneumatic conveyance system and/or the fill hopper. As such, to avoid excessive pressure buildup within the secondary storage container 36 and/or to facilitate filling/refilling, the exhaust system 48 may be used to vent the secondary storage container 36 by guiding air flow out of the secondary storage container 36 while blocking the granular product. For example, in the depicted embodiment, the exhaust system 48 may be positioned on an opposite end from the inlet ports 44. As depicted, the exhaust system 48 includes media screens 46 and a diffuser 54.

More specifically, the air flow may proceed through one or more media screens 46 (e.g., grills, deflectors, shields, porous media, or grates). As depicted, the media screens 46 include apertures to enable air flow out of the secondary product container 36. On the other hand, the media screen 46 may be used to block the granular product from entering the exhaust system 48 and being undesirably expelled. In other words, the media screens 46 may be used to filter out the granular product. For example, when canola seeds are covered with a residue and/or powder, the media screen 46 may enable the air flow to escape while blocking the seeds as well as at least a portion of the residue. As will be described in more detail below, to improve the filtering capabilities, multiple media screens 46 may be used.

Once the air passes through the media screens 46, a passage 50 may guide the air flow out of the secondary product container 36. As depicted, the passage 50 is fluidly coupled to the diffuser 54. Although, in the depicted embodiment, the passage 50 is built into the secondary product container 36, in other embodiments, the passage may be a separate component coupled to the secondary product container 36.

Additionally, an exhaust valve 56, by selectively coupling to a seal 52, may be used to control air flow from the passage 50 into the diffuser 54. The exhaust valve 56 may include a stem and a valve. When the exhaust valve 56 is open, the air flow passes through the passage 50 into the diffuser 54. The diffuser 54 may then diffuse (e.g., spread out) the air flow toward the ground. On the other hand, when the exhaust valve handle 58 is in the closed position, the exhaust valve 56 rests against the seal 52 and blocks the air flow from flowing out of the passage 50. In other words, the seal and/or valve may be closed to block and opened to enable air flow to pass from the interior to the exterior of the secondary product container 36.

To facilitate moving the exhaust valve 56 between the open position and the closed position, a handle 58 may be coupled through the diffuser 54 to the valve by a stem. More specifically, as will be described in more detail below, the handle 58 may be rotated in a first rotation direction (e.g., a quarter turn) and axially translating the handle in a first translation direction (e.g., pushing) to open exhaust valve 56. When the exhaust valve 56 is open, the handle may be axially translated in a second translation direction, opposite the first translation direction, and rotated in a second rotation direction (e.g., a quarter turn), opposite the first rotation direction, to close exhaust valve 56 (e.g., rest the exhaust valve 56 against the seal 52).

Figure 3:
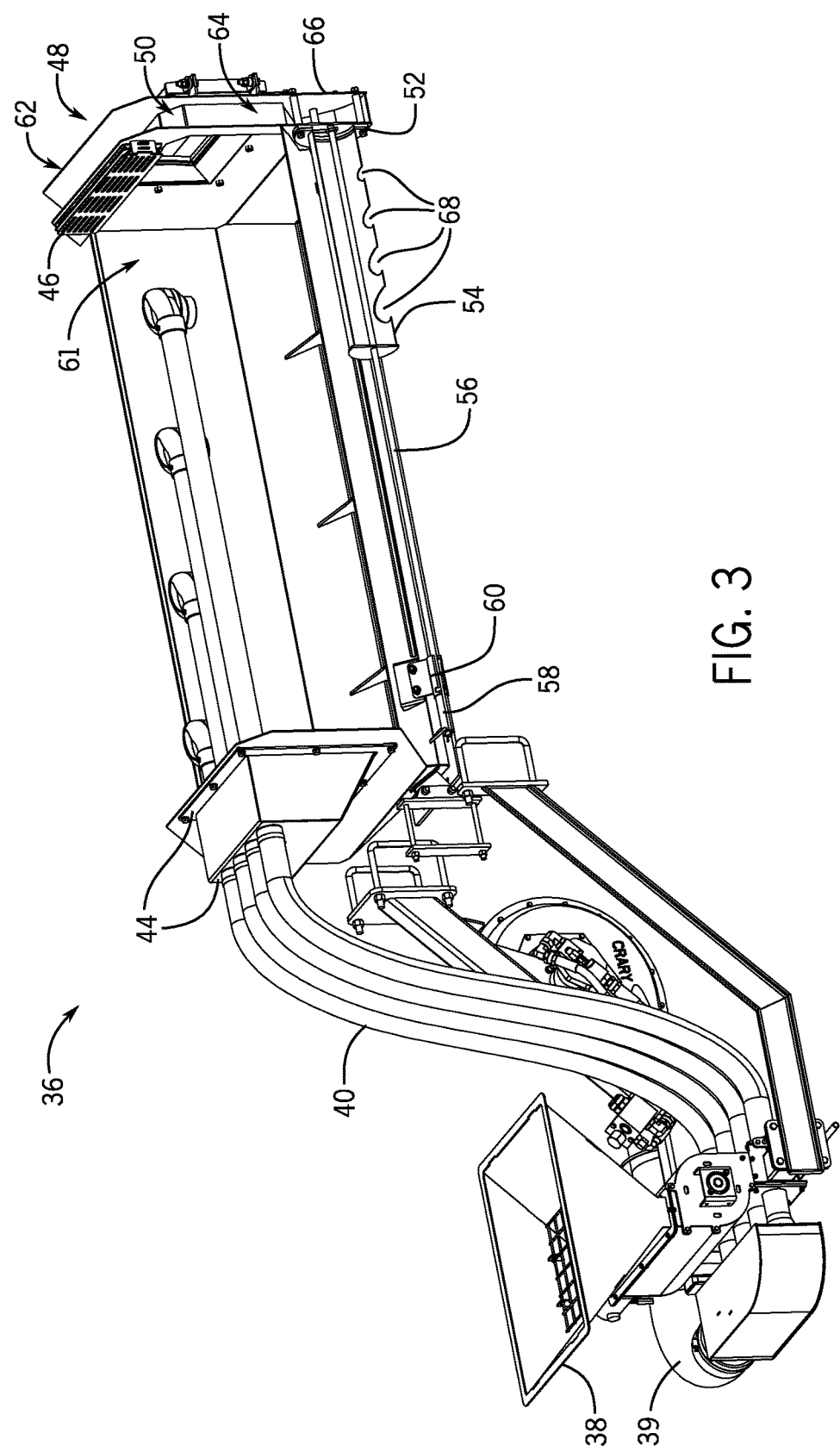
FIG. 3 is a cross sectional perspective view of the secondary product container and fill system of the FIG. 2, in accordance with an embodiment of the present disclosure.

As described above, when the exhaust valve 56 is open, the diffuser 54 may diffuse the air flow. To help illustrate, a cross sectional perspective view of the diffuser 54 and the secondary product container 36 are shown in FIG. 3. As described above, the passage 50 may fluidly couple the interior 61 of the secondary product container 36 to the diffuser 54. More specifically, in the depicted embodiment, air may flow through the media screens 46, a top portion 62 of the passage 50, a side portion 64 of the passage 50, and into the diffuser 54 (e.g., when the exhaust valve 56 is open).

As depicted, the diffuser 54 includes multiple diffuser apertures 68 to facilitate diffusing and directing the air flow in a downward direction toward the ground. More specifically, in the depicted embodiment, the diffuser 54 uses apertures 68 increasing in size to facilitate evenly distributing the air flow. For example, relative to the passage 50, the closest diffuser aperture 68 (e.g., first diffuser aperture) may be the smallest while a second diffuser aperture farther from the passage may have a larger area. Accordingly, the farthest diffuser aperture 68 may be largest. Moreover, since the apertures 68 face downward, any granular product that remains in the air flow may be directed toward the soil.

Figure 4:
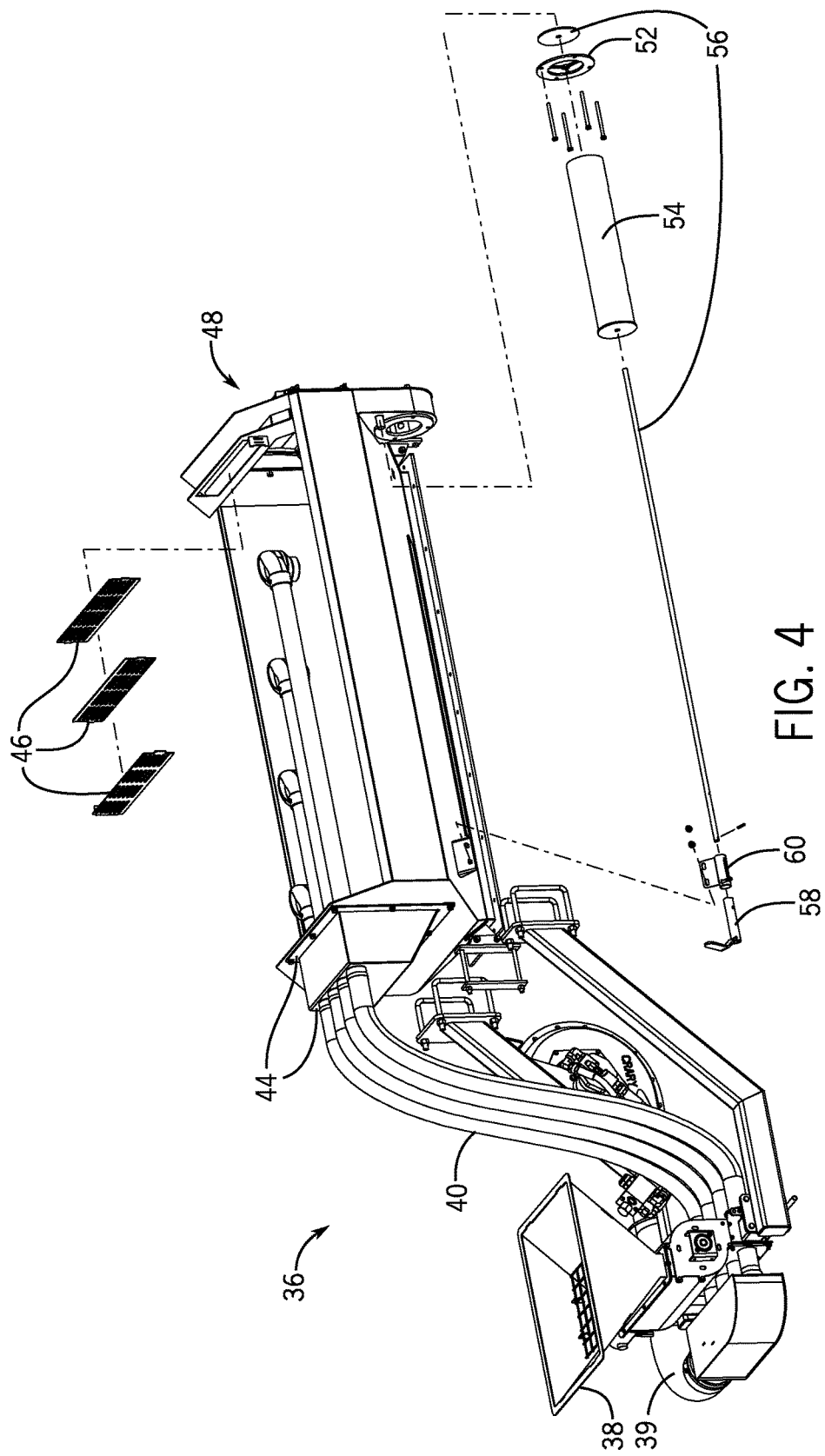
FIG. 4 is an exploded perspective view of the secondary product container and fill system of FIG. 2, in accordance with an embodiment of the present disclosure.

As described above, multiple media screens 46 may be used to reduce the likelihood of the granular product being undesirably expelled from the secondary product container 36. To help illustrate, an exploded perspective view of the secondary product container 36 and the diffuser 54 are shown in FIG. 4. In an embodiment, three media screens 46 are used. However, in other embodiments, the number and/or size of the media screens 46 may vary.

Additionally, in some embodiments, the apertures of the media screens 46 may be offset (e.g., staggered) from one another to further reduce the likelihood of granular product entering the exhaust system 48. For example, a first media screen 46 may include apertures that are offset from the apertures of a second media screen 46. As such, when a granular product passes through the first media screen 46, the second media screen 46 is likely to block the granular product because its apertures are offset from the apertures of the first media screen 46. Additionally, a third media screen 46 may include apertures offset from the first and/or the second media screen 46. Further offset media screen variations may involve different size and/or shape of apertures on the media screens 46.

Figure 5:
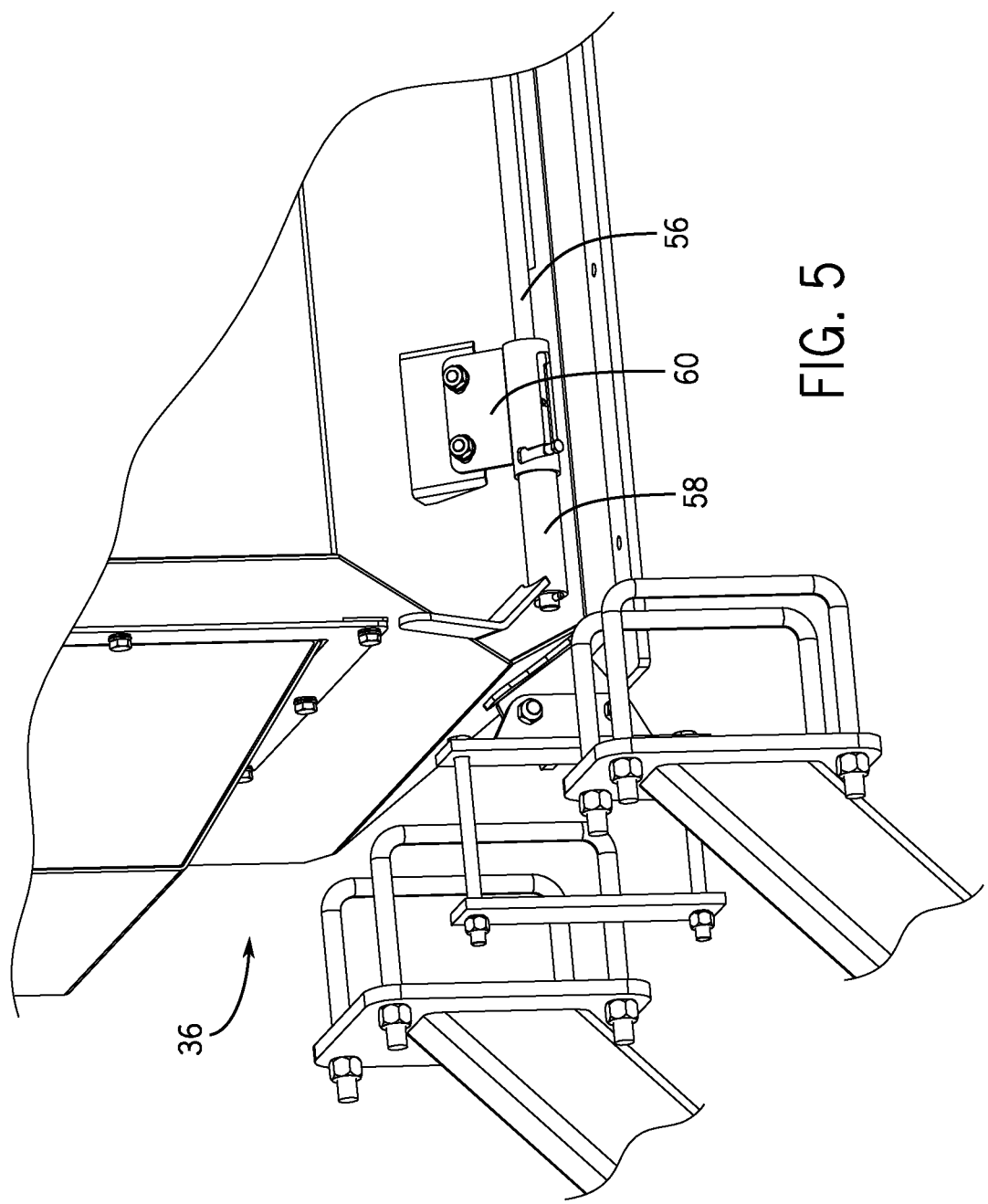
FIG. 5 is a perspective view of an exhaust valve handle, an exhaust valve handle mount, and a stem, in accordance with an embodiment of the present disclosure.

As described above, an operator may open or close the exhaust valve 56 using a handle 58. To help illustrate, a detailed view of the handle 58 is shown in FIG. 5. As depicted, the exhaust valve handle 58 is coupled to the exterior of the secondary product container 36 by an exhaust valve handle mount 60. More specifically, the exhaust valve handle mount 60 may enable the handle 58 to actuate the stem 56 (e.g., to open or close the exhaust valve 56 with respect to the seal 52). For example, in the depicted embodiment, an operator may rotate the exhaust valve handle 58 a quarter turn (e.g., 90 degrees) and push to open the exhaust valve 56.

Figure 6:
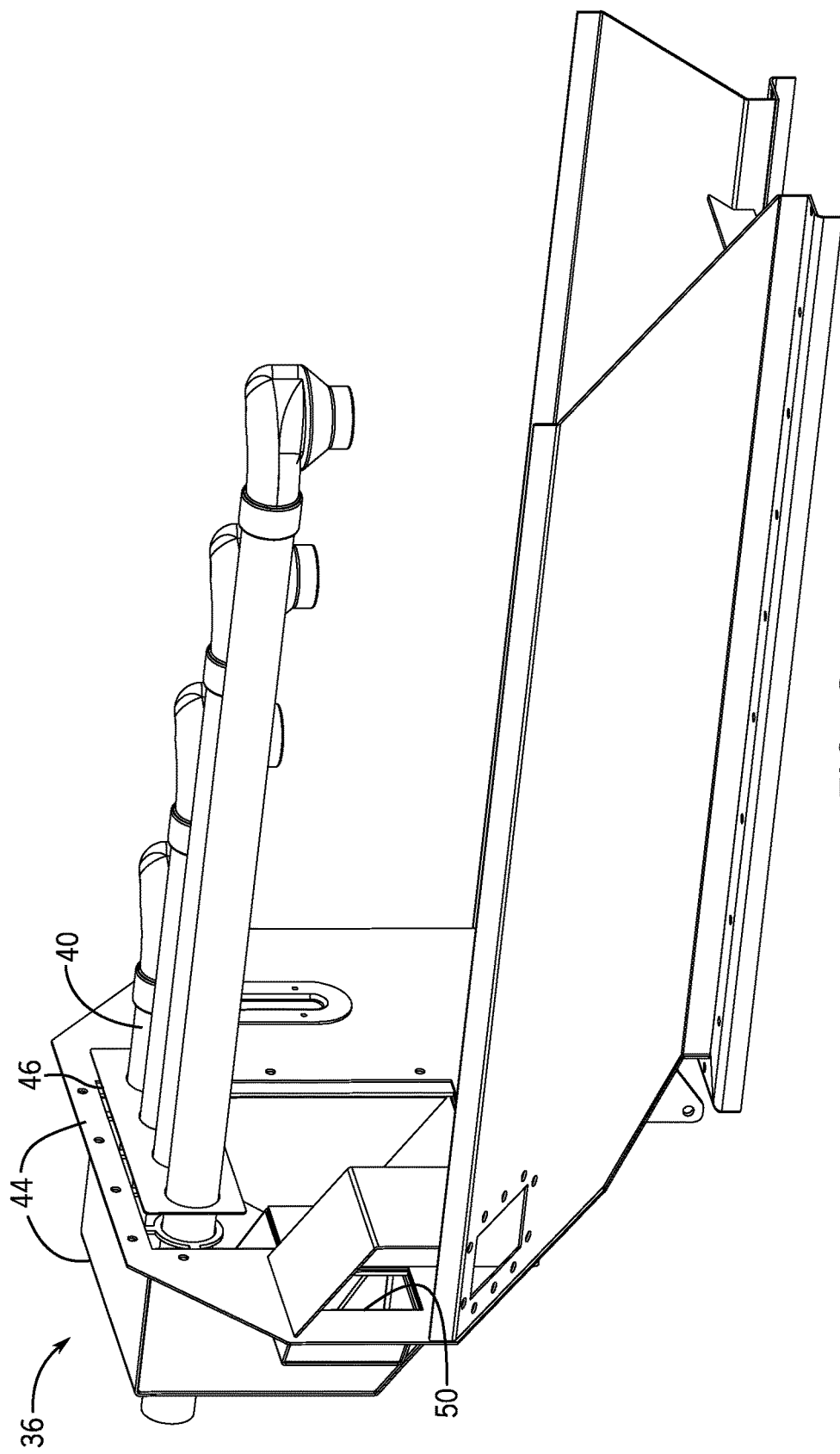
FIG. 6 is a perspective view of a secondary product container with another exhaust system, in accordance with an embodiment of the present disclosure.

In the embodiments described above, the exhaust system 48 is included on the opposite end of the secondary product container 36 from the inlet ports 44. However in other embodiments, the exhaust system 48 may be included on the same end of the secondary product container 36 as the inlet ports 44. To help illustrate, one such embodiment with the lid 45 removed is shown in FIG. 6.

Generally, the exhaust system 48 may operate in the same manner. For example, air flow may flow through a media screen 46, which blocks the granular product from being expelled while enabling air flow to pass. The air may then flow into the passage 50, which selectively routes the air to the diffuser 54 for output. Alternatively or additionally, the passage 50 may direct the air flow toward the ground.

Figure 7:
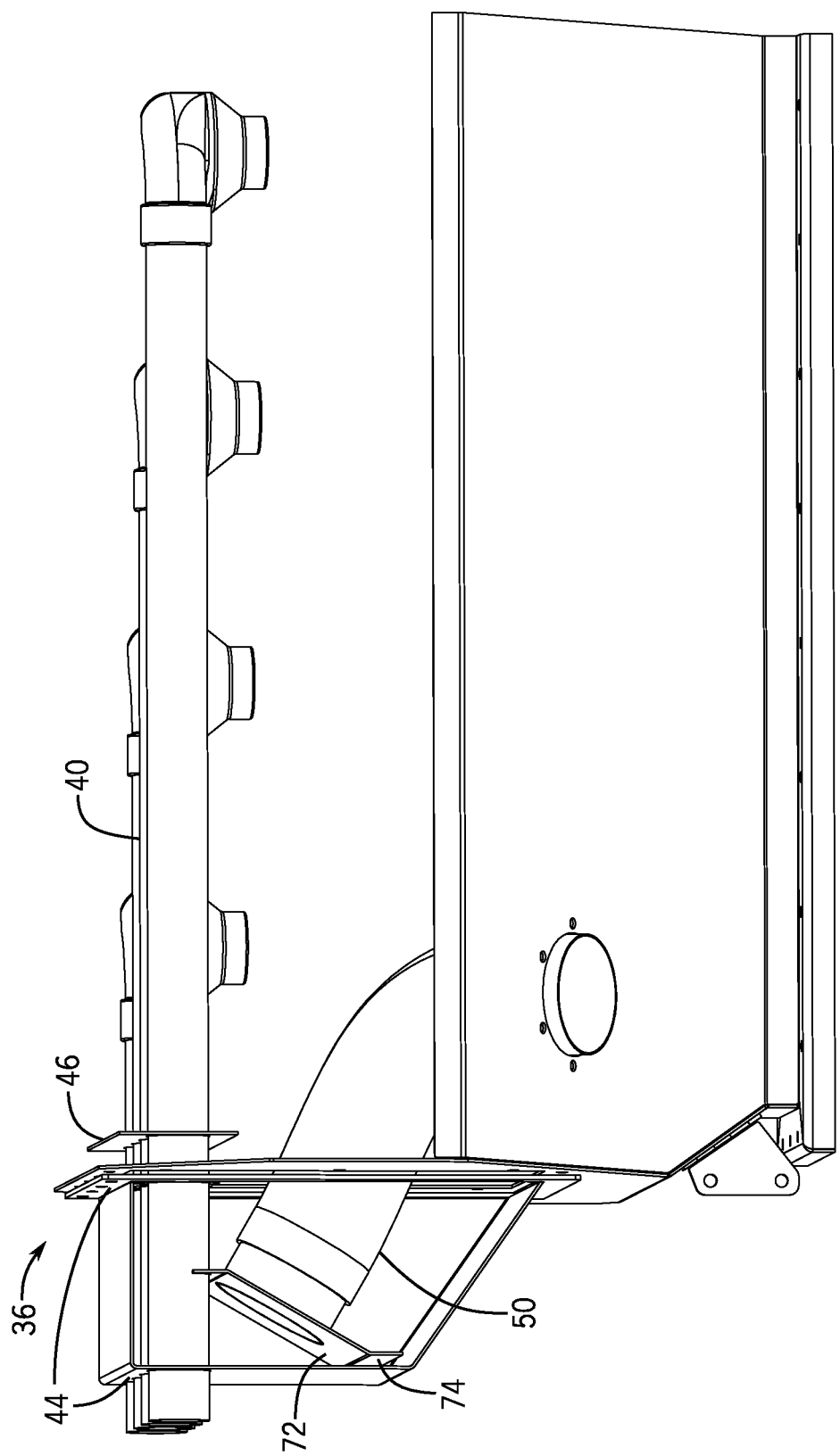
FIG. 7 is a side view of the secondary product container and an alternative exhaust system, in accordance with an embodiment of the present disclosure.

In addition to the media screen 46, a shield 72 may be used to reduce the likelihood of the granular product entering the exhaust system 48. Alternatively, the media screen 46 may simply be a solid piece (e.g., deflector) to deflect granular product from entering the exhaust system 48. To help illustrate, an alternative embodiment side view of the secondary product container 36 is shown in FIG. 7. As depicted, the shield 72 may provide a narrow opening 74 to enable air to flow into the passage 50. The shield 72 may enable the granular product to fall back into the main cavity of the secondary product container 36 as the tank level dropped below the shield 72 height. Additionally, as depicted, the inlet ports 44 may support the inlet tubes 40.

As such, the technical effects described herein may include improving filling/refilling of a product container. More specifically, an exhaust system may be used to enable air displaced by granular product supplied to the product container and air from the pneumatic conveyance system to be vented. In some embodiments, media screens may be used to reduce the likelihood of the granular product entering the exhaust system and being undesirably expelled.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An exhaust system of an agricultural product container, comprising:
 a first media screen configured to be coupled to the agricultural product container, wherein the first media screen comprises a first plurality of apertures, wherein the first media screen is configured to block a granular product from entering the exhaust system and to enable an air flow into the exhaust system;
 a second media screen parallel to the first media screen, wherein the second media screen comprises a second plurality of apertures, wherein the second plurality of apertures is offset from the first plurality of apertures;
 a diffuser comprising a first diffuser aperture configured to diffuse the air flow in a downward direction; and
 a passage fluidly coupled between the first media screen and the diffuser, wherein the passage is configured to selectively guide the air flow from the first and second media screens toward the diffuser.

2. The exhaust system of claim 1, wherein the diffuser comprises a second diffuser aperture, wherein the first diffuser aperture is closer to the passage and has a smaller area, and the second diffuser aperture is farther from the passage and has a larger area.

3. The exhaust system of claim 1, comprising an exhaust valve coupled between the passage and the diffuser, wherein the exhaust valve is configured to enable the air flow to flow into the diffuser when in an open position and to block the air flow from flowing into the diffuser when in a closed position.

4. The exhaust system of claim 3, comprising an exhaust valve handle coupled to the exhaust valve, wherein the exhaust valve handle is configured to enable an operator to move the exhaust valve between the open position and the closed position by rotating the exhaust valve handle.

5. The exhaust system of claim 4, wherein the exhaust valve is configured to move to the open position when the exhaust valve handle is rotated in a first rotation direction and axially translated in a first translation direction.

6. The exhaust system of claim 5, wherein the exhaust valve is configured to move to the closed position when the exhaust valve handle is axially translated in a second translation direction, opposite the first translation direction, and rotated in a second rotation direction, opposite the first rotation direction.

7. The exhaust system of claim 1, comprising a third media screen parallel to the first media screen and the second media screen, wherein the third media screen has a third plurality of apertures, wherein the third plurality of apertures is offset from the second plurality of apertures.

8. An exhaust system of an agricultural product container, comprising:
 a first media screen configured to be coupled to the agricultural product container, wherein the first media screen comprises a first plurality of apertures, wherein the first media screen is configured to block a granular product from entering the exhaust system and to enable an air flow into the exhaust system in a first direction;
 a diffuser comprising a first diffuser aperture configured to diffuse the air flow; and
 a passage fluidly coupled between the first media screen and the diffuser, wherein the passage is configured to selectively guide the air flow from the first media screen toward the diffuser by directing the air flow in a second direction, different from the first direction.

9. The exhaust system of claim 8, wherein the diffuser comprises a second diffuser aperture, wherein the first diffuser aperture is closer to the passage and has a smaller area, and the second diffuser aperture is farther from the passage and has a larger area.

10. The exhaust system of claim 8, comprising an exhaust valve coupled between the passage and the diffuser, wherein the exhaust valve is configured to enable the air flow to flow into the diffuser when in an open position and to block the air flow from flowing into the diffuser when in a closed position.

11. The exhaust system of claim 10, comprising an exhaust valve handle coupled to the exhaust valve, wherein the exhaust valve handle is configured to enable an operator to move the exhaust valve between the open position and the closed position by rotating the exhaust valve handle.

12. The exhaust system of claim 11, wherein the exhaust valve is configured to move to the open position when the exhaust valve handle is rotated in a first rotation direction and axially translated in a first translation direction.

13. The exhaust system of claim 12, wherein the exhaust valve is configured to move to the closed position when the exhaust valve handle is axially translated in a second translation direction, opposite the first translation direction, and rotated in a second rotation direction, opposite the first rotation direction.

14. The exhaust system of claim 8, wherein the passage is configured to direct the air flow to exit the passage in a third direction, opposite the first direction.

15. The exhaust system of claim 8, wherein the first direction comprises a lateral direction and the second direction comprises a downward direction.

16. An exhaust system of an agricultural product container, comprising:
 a first media screen configured to be coupled to the agricultural product container, wherein the first media screen comprises a first plurality of apertures, wherein the first media screen is configured to block a granular product from entering the exhaust system and to enable an air flow into the exhaust system;
 a diffuser comprising a first diffuser aperture configured to diffuse the air flow in a downward direction;
 a passage fluidly coupled between the first media screen and the diffuser, wherein the passage is configured to selectively guide the air flow from the first media screen toward the diffuser;
 an exhaust valve system comprising a stem and a valve, wherein the valve is coupled to the stem on a first longitudinal end of the stem, and wherein the exhaust valve system is configured to selectively control air flow from the passage to the diffuser; and
 an exhaust valve handle coupled to a second longitudinal end of the stem, opposite the first longitudinal end, wherein the exhaust valve handle is configured to enable an operator to move the exhaust valve system between an open position and a closed position by actuating the exhaust valve handle.

17. The exhaust system of claim 16, wherein the valve, the exhaust valve handle, and the stem are coupled such that linear actuation of the exhaust valve handle causes linear movement of the valve.

18. The exhaust system of claim 16, wherein the first media screen is configured to enable the air flow into the exhaust system in a first direction, and wherein the passage is configured to selectively guide the air flow from the first media screen toward the diffuser by directing the air flow in a second direction, different from the first direction.

19. The exhaust system of claim 18, wherein the passage is configured to direct the air flow to exit the passage in a third direction, opposite the first direction.

20. The exhaust system of claim 18, wherein the first direction comprises a lateral direction and the second direction comprises a downward direction.

* * * * *